(12) United States Patent
Charrat

(10) Patent No.: US 10,887,002 B1
(45) Date of Patent: Jan. 5, 2021

(54) TELECOMMUNICATIONS PAYLOAD WITH COVERAGE AND CAPACITY FLEXIBILITY

(71) Applicant: THALES, Courbevoie (FR)

(72) Inventor: Bernard Charrat, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/903,333

(22) Filed: Jun. 16, 2020

(30) Foreign Application Priority Data

Jun. 20, 2019 (FR) .................................. 19 06634

(51) Int. Cl.
*H04B 7/185* (2006.01)
(52) U.S. Cl.
CPC ..... *H04B 7/18513* (2013.01); *H04B 7/18515* (2013.01); *H04B 7/18519* (2013.01)
(58) Field of Classification Search
CPC ............................................ H04B 7/185–216
See application file for complete search history.

(56) References Cited

U.S. PATENT DOCUMENTS 8,712,321 B1 * 4/2014 Dankberg .......... H04B 7/18519
455/12.1

9,848,370 B1    12/2017 Freedman et al.
10,291,315 B1 *  5/2019 Tong ................. H04B 7/18578
10,749,596 B2 *  8/2020 Ginesi ................. H04B 17/345

FOREIGN PATENT DOCUMENTS

EP        3 297 174 A1     3/2018

* cited by examiner

*Primary Examiner* — Raymond S Dean
(74) *Attorney, Agent, or Firm* — BakerHostetler

(57) ABSTRACT

A telecommunications payload for multibeam satellite coverage, includes at least one antenna and a plurality of sources connected to the antenna in order to deliver a beam corresponding to a spot on the Earth's surface, the satellite comprising a plurality of high-power amplifiers configured so as to supply the sources, wherein the payload also comprises a plurality of ring-shaped routing devices, each ring-shaped routing device comprising Ne input ports, where Ne≥2, each input port being connected to one of the high-power amplifiers, and also comprising Ns output ports, each output port being connected firstly to a source, and being able to be connected secondly to at most one input port, and change alternately from a connection state to a disconnection state, each ring-shaped routing device being configured such that, at a time t, Ne output ports out of the Ns output ports are able to be supplied depending on the desired coverage. The invention makes it possible to achieve coverage and capacity distribution flexibility.

10 Claims, 11 Drawing Sheets

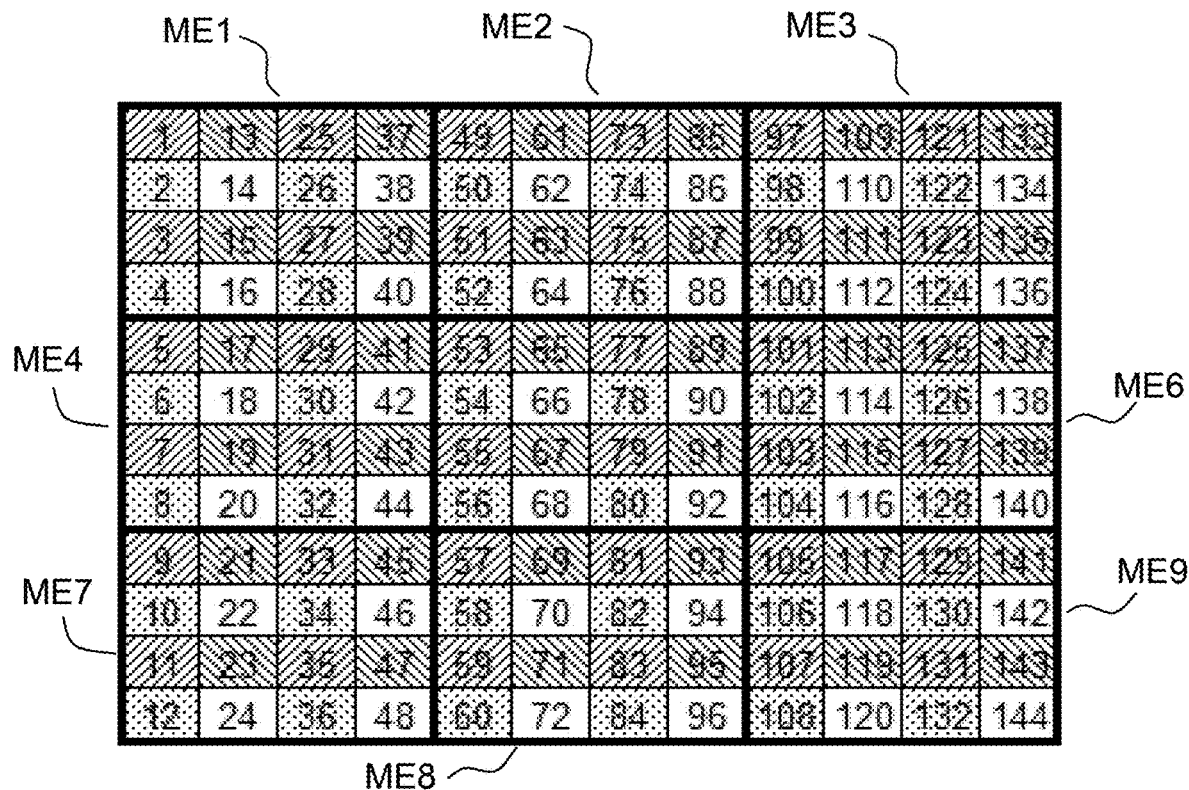
Distribution of the spots over the coverage
Key:
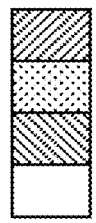
Number: number of the spot from 1 to 144
band 1, polarization 1 = colour 1
band 1, polarization 2 = colour 2
band 2, polarization 1 = colour 3
band 2, polarization 2 = colour 4
FIG.5

FIG.6

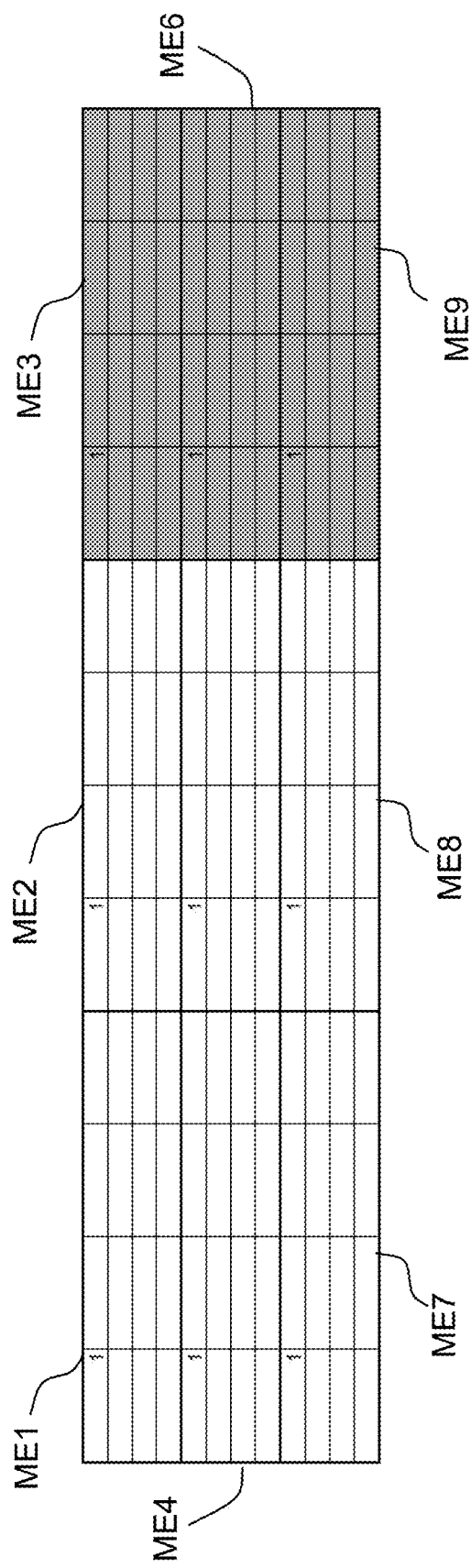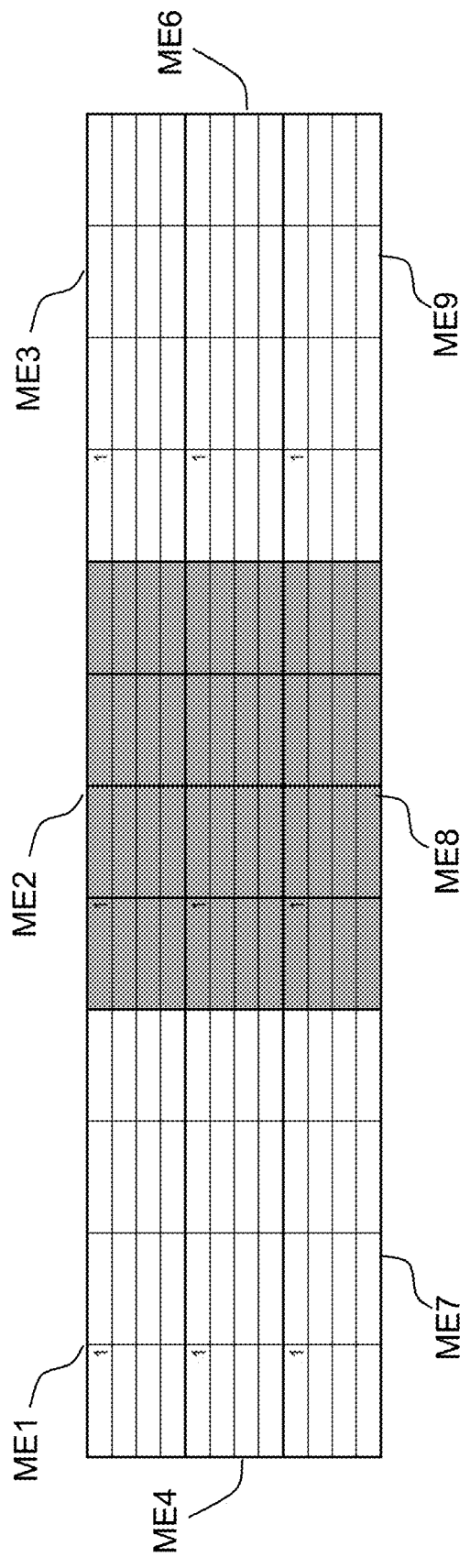

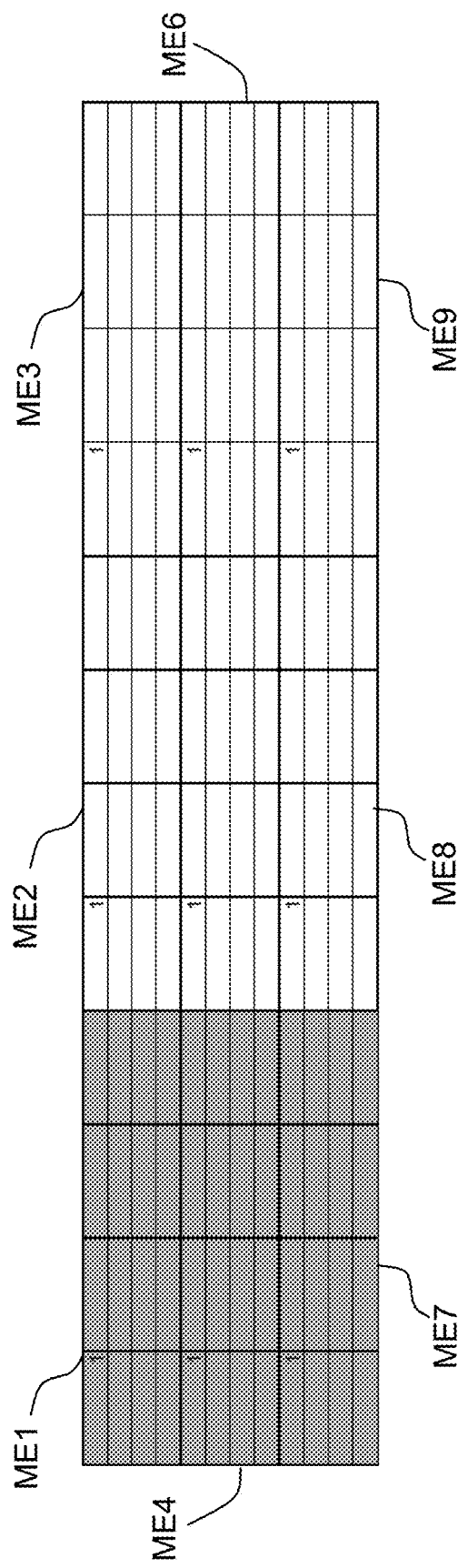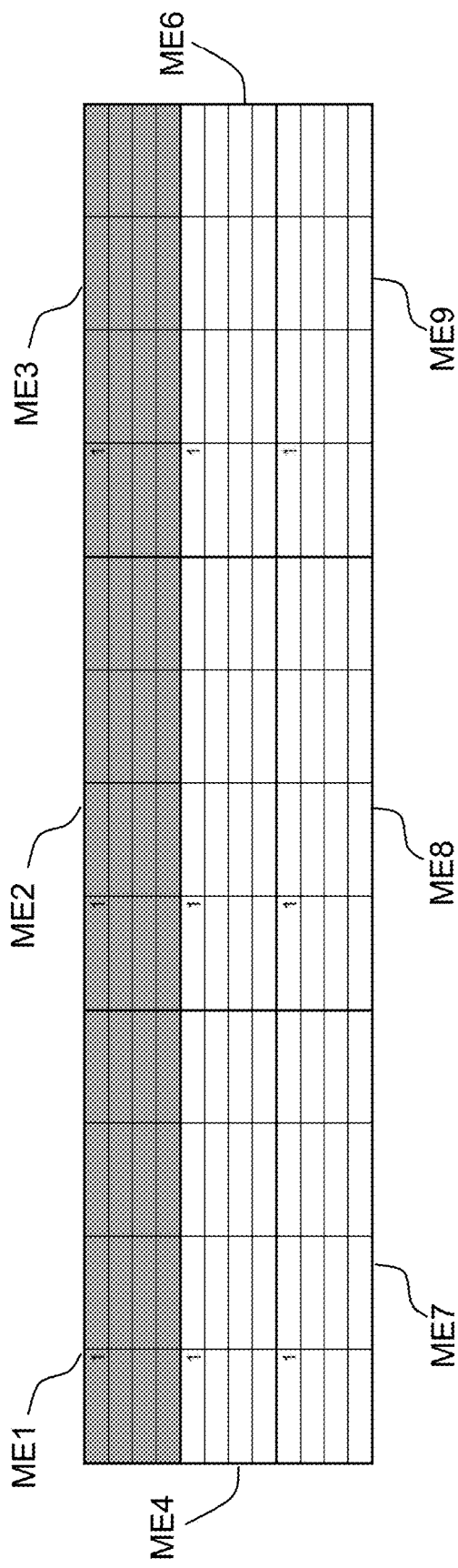

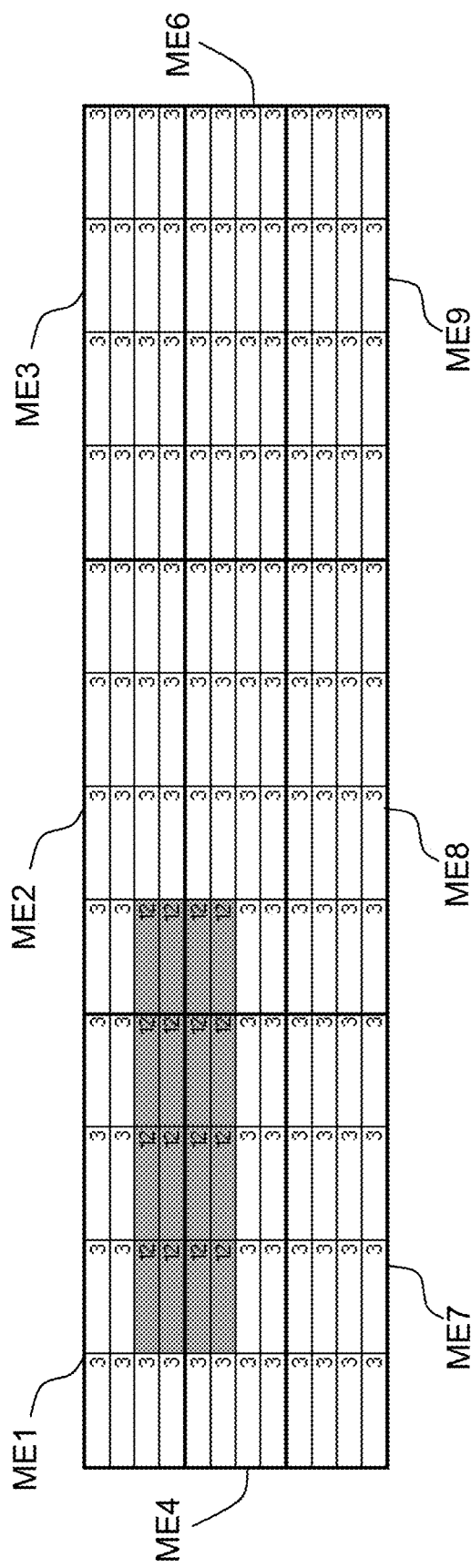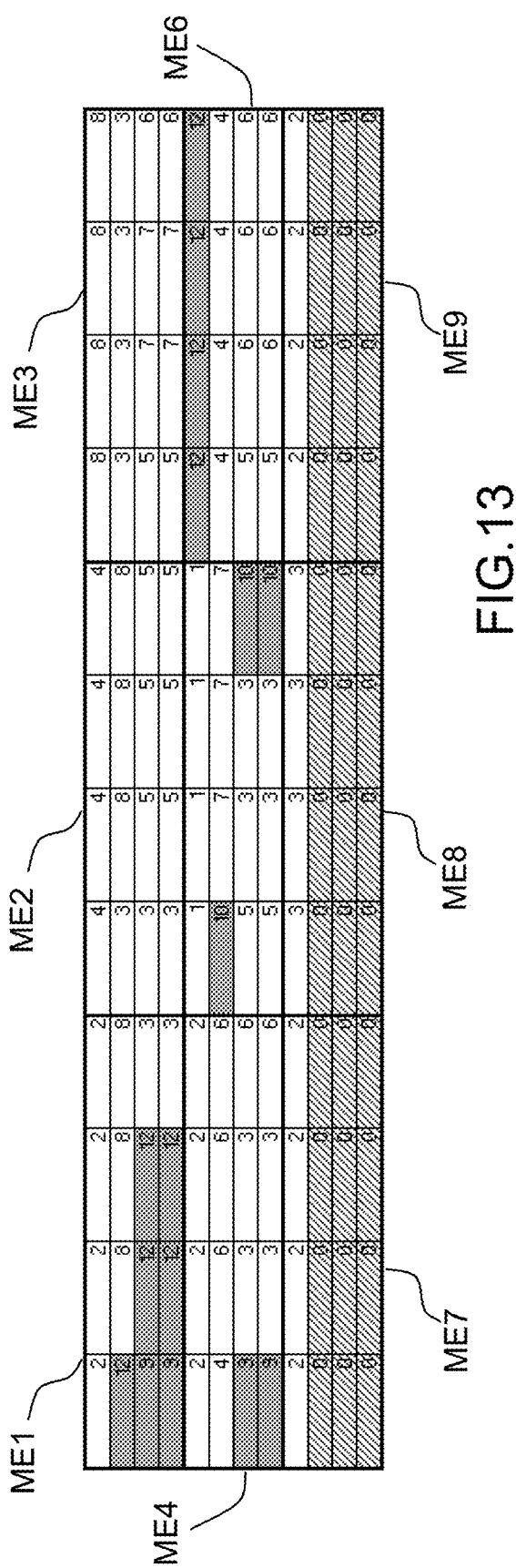
FIG.12
FIG.13

TELECOMMUNICATIONS PAYLOAD WITH COVERAGE AND CAPACITY FLEXIBILITY

CROSS-REFERENCE TO RELATED APPLICATIONS

This application claims priority to foreign French patent application No. FR 1906634, filed on Jun. 20, 2019, the disclosure of which is incorporated by reference in its entirety.

FIELD OF THE INVENTION

The invention lies in the field of multibeam (or multispot) space telecommunications. The invention lies in particular in the field of high-throughput satellites (HTS) and very-high-throughput satellites (VHTS) that implement frequency reuse technology on very narrow beams (generally between 0.3° and 0.7°). Frequency reuse makes it possible to multiply the capacity of the satellite in comparison with previous-generation satellites.

BACKGROUND

Multibeam telecommunications satellites make it possible to cover a portion of the Earth's surface where a certain number of users are located. The surface is divided into spots whose capacity varies depending on demand, that is to say the estimated number of users. A relatively low capacity may be allocated to spots located in areas where demand is low, for example in desert areas. By contrast, in areas with a high population density, for example coastal areas, a higher capacity per spot is required. A telecommunications system is thus said to be flexible in terms of capacity and in terms of coverage when it is able to adapt the offered capacity and coverage to the capacity demand of users and to their geographical distribution. It should be noted that user demand varies over time throughout one and the same day. For example, in one and the same spot, demand is generally greater at 6 p.m. than at 3 a.m.

A beam generated by an antenna (by one or more sources and a reflector) corresponds to each spot. Upstream of the antennas, the signal is amplified by a high-power amplifier, generally a travelling wave tube or a solid-state amplifier, in order to amplify the payload data transmitted by a satellite gateway (or docking station) located on the ground on an outward path, or by a user terminal on a return path.

In order to limit the number of high-power amplifiers on board the satellite while still having a high number of spots, time multiplexing is implemented. Time multiplexing, also called beam hopping, makes it possible to illuminate each beam supplied by one and the same amplifier system for a duration proportional to traffic demand, thereby making it possible to achieve a certain level of capacity and coverage flexibility.

Flexibility in terms of coverage is understood to mean the possibility of illuminating certain areas (or not illuminating them) of the total surface covered by the satellite. Flexibility in terms of coverage may be required when this involves for example successively illuminating a plurality of regions having different longitudes, on the basis of the time offset. Another example of coverage flexibility consists in successively illuminating a plurality of regions that follow the trajectory of an aircraft.

Telecommunications systems therefore have to offer telecommunications operators low-cost and reliable adaptive capacity distribution based on demand, allowing very fast reconfigurations.

Several solutions exist at present for achieving beam-hopping coverage.

The first solution consists in using SP2T (for single pole double throw, or one input and two outputs) ferrite switches. The data to be transmitted to the users are amplified in high-power amplifiers, and they are then distributed over a plurality of beams, on the basis of a predetermined spatio-temporal scheme. The term "high-power amplifiers" is understood to mean amplifiers configured so as to supply an output power of between 10 W and 200 W. SP2T ferrite switches operate on the principle of a circulator. The circulation direction around the circulator depends on the polarizing magnetic field that is applied. The output power thus switches between two output ports depending on the polarizing magnetic field, so as to implement what is called a 1 to 2 switching scheme. Although it is possible in theory to cascade a plurality of SP2T ferrite switches in order to implement a 1 to N switching scheme, this cascading is generally limited to 1 to 4, by cascading two levels of SP2T ferrite switches. Specifically, beyond two SP2T ferrite switches, losses start to become substantial, given the power of the signals to be transmitted.

This solution offers a first level of flexibility, with the possibility of temporally sharing a high-power amplifier among N beams, generally two or four. It moreover makes it possible to make full use of the frequency band of the tubes. There are therefore a lower number of tubes that are used at their maximum bandwidth. However, with a 1 to 2 or 1 to 4 switching scheme, capacity is able to be exchanged only within a small group of spots (two or four spots), thereby offering flexibility with reduced adaptability. If for example two associated spots within one and the same group in a 1 to 2 switching scheme request more capacity, the request cannot be met.

Another solution consists in using a digital processor (which may be transparent or regenerative), or DP. The digital processor makes it possible to assign the dynamically adaptable required payload band to each high-power amplifier input. Each high-power amplifier then directly supplies a spot (which receives the entire band of the amplifier) or a plurality thereof, which each receive a portion of the band according to a predefined band division that is fixed over time. Due to this, the amplifier has to be dimensioned (in terms of power) for the case of transmission of the maximum band, and will be underused in the opposite case, which results in the high-power amplifiers being overdimensioned, but has the advantage of flexibility with very high adaptability.

None of the solutions from the prior art make it possible to simultaneously achieve flexibility and very high adaptability while at the same time minimizing the number of high-power amplifiers. The invention aims to achieve a solution that has these various features.

SUMMARY OF THE INVENTION

The invention therefore relates to a telecommunications payload for multibeam satellite coverage, comprising at least one antenna and a plurality of sources connected to the antenna in order to deliver a beam corresponding to a spot on the Earth's surface, the payload comprising a plurality of high-power amplifiers configured so as to supply the sources, characterized in that the payload also comprises a plurality of ring-shaped routing devices, each ring-shaped routing device comprising Ne input ports, where Ne≥2, each input port being connected to one of the high-power amplifiers, and also comprising Ns output ports, each output port being connected firstly to a source, and being able to be connected secondly to at most one input port, and changing alternately from a connection state to a disconnection state, each ring-shaped routing device being configured such that, at a time t, Ne output ports out of the Ns output ports are able to be supplied depending on the desired coverage.

Advantageously, the payload comprises a control device configured so as to control, in each ring-shaped routing device, the connection or the disconnection of each output port with respect to each of the input ports, the control device applying a command such that, for each data signal received by the payload and arriving at an input port, there is only one possible path between the input port and the desired output port, and that there is no interference between various paths in the ring-shaped routing device.

Advantageously, the control device is configured so as to implement time multiplexing such that, over a given period, for each set of Ne frames each formed of a number of identical time slots, the sum of the time slots received simultaneously at each of the Ne input ports of the ring-shaped routing device is equal to the sum of the time slots associated with the connected output ports of one and the same ring-shaped routing device, the number of connected output ports over said period being between Ne and Ns.

Advantageously, the surface covered by the telecommunications satellite is able to be divided into Ns elementary meshes, each elementary mesh containing as many spots as the payload comprises ring-shaped routing devices.

Advantageously, the input and output ports are connected to one another, in the ring-shaped routing device, by at least one R-type ferrite switch or by at least one SP2T ferrite switch.

Advantageously, the ring-shaped routing device comprises a first, a second and a third input port, and a first, a second, a third, a fourth, a fifth, a sixth, a seventh, an eighth and a ninth output port, and moreover comprises a first R-type ferrite switch coupled to the first input port and to the first output port, a second R-type ferrite switch coupled to the first ferrite switch, to the second output port and to the third output port, a third R-type ferrite switch coupled to the second R-type ferrite switch, to the second input port and to the fourth output port, a fourth ferrite switch coupled to the third R-type ferrite switch, to the fifth output port and to the sixth output port, a fifth R-type ferrite switch coupled to the fourth R-type ferrite switch, to the third input port and to the seventh output port, a sixth R-type ferrite switch coupled to the fifth R-type ferrite switch, to the first R-type ferrite switch, to the eighth output port and to the ninth output port.

Advantageously, the ring-shaped routing device comprises a first and a second input port, and a first, a second, a third and a fourth output port, and moreover comprises a first R-type ferrite switch coupled to the first input port, to the first output port and to the third output port, and a second R-type ferrite switch coupled to the second input port, to the second output port and to the fourth output port.

Advantageously, the payload comprises a plurality of filtering devices, each filtering device being coupled to one of the high-power amplifiers, each filtering device comprising a high-pass filter and a low-pass filter, the input ports of a ring-shaped routing device being coupled exclusively to high-pass filters or exclusively to low-pass filters.

Advantageously, the payload comprises sixteen ring-shaped routing devices, and wherein Ne=3, Ns=9.

The invention also relates to a satellite comprising an abovementioned payload.

BRIEF DESCRIPTION OF THE DRAWINGS

The invention will be better understood and other features and advantages will become more clearly apparent upon reading the non-limiting description which follows, and by virtue of the appended figures, among which:

FIG. 5 shows a distribution scheme of the spots over the coverage, using a four-colour scheme.

FIG. 6 shows a connection table between the spots and the outputs of the routing devices according to the invention.

FIGS. 7A, 7B, 7C, 8A, 8B, 8C, 9A, 9B, 10, 11, 12 and 13 show various coverage examples able to be achieved using the satellite according to the invention.

Hereinafter, when the same references are used in figures, they denote the same elements.

DETAILED DESCRIPTION

Figure 1:
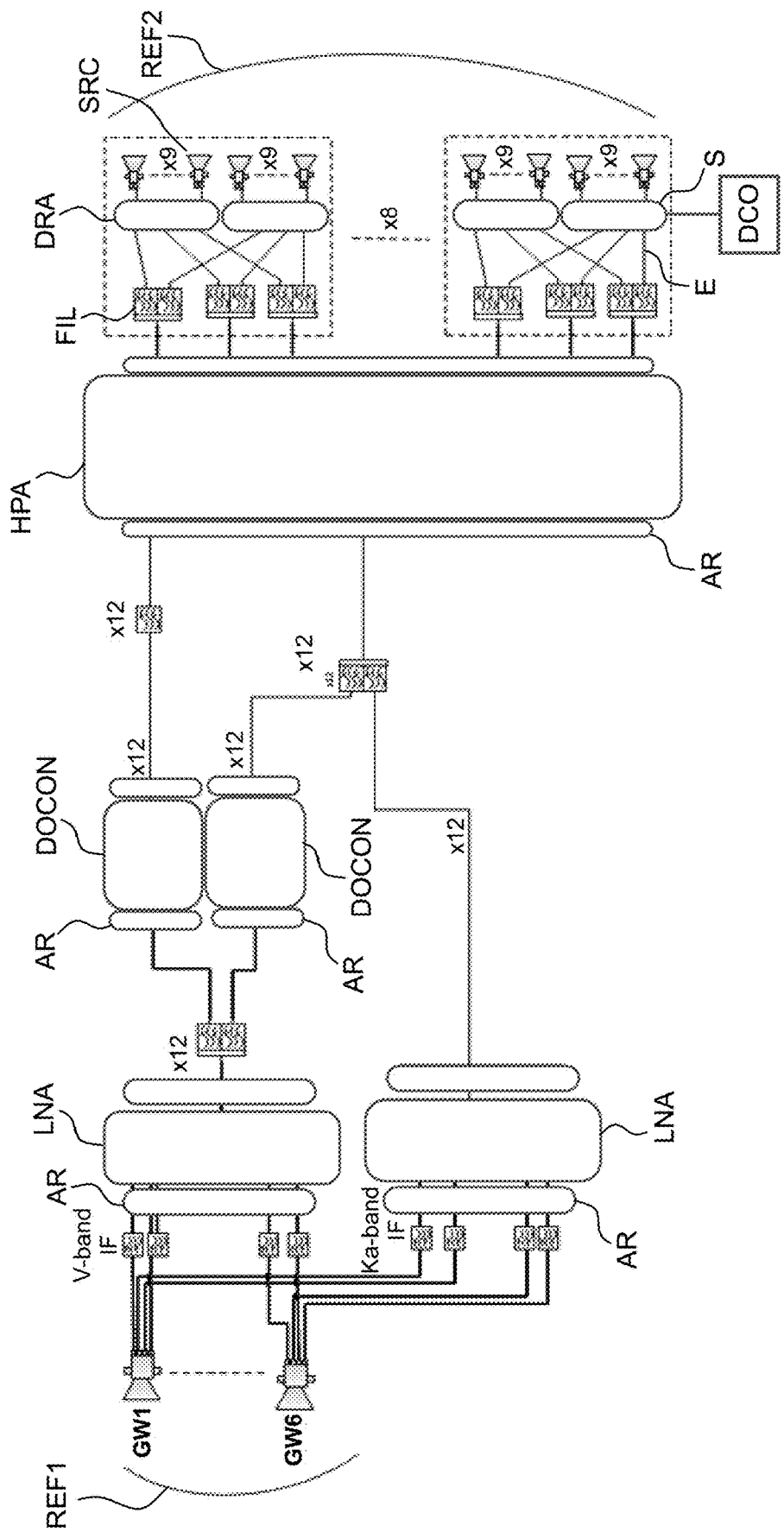
FIG. 1 shows an overview of the payload, outward path, of a satellite according to the invention.

FIG. 1 shows an overview of the payload, outward path, of a satellite according to the invention. In particular, the payload illustrated in FIG. 1 represents that of an HTS or VHTS satellite. The signals transmitted by the various docking stations on the uplink of the outward path are received at various reception sources (GW1, . . . , GW6), each reception source being dedicated to a docking station. A reflector REF1 makes it possible to bundle the signals transmitted by the various docking stations.

The reception band of the uplink comprises two sub-bands, which may be separate, for example the 30/20 GHz band and the V band. Each signal is amplified by low-noise amplifiers LNA. The signals modulated on the frequency of the uplink are brought to the frequency of the downlink (for example the Ka band) by frequency-lowering converters DOCON. Bandpass filtering is performed at the frequency of the downlink for each of the received frequency channels. Each filter has a bandwidth corresponding to the total band amplified by each high-power amplifier. An amplification section makes it possible to amplify the signals before they are transmitted on the downlink, for example in the Ka band. The amplification section comprises a plurality of high-power amplifiers HPA. The high-power amplifiers HPA may be travelling wave tubes or any other device capable of amplifying the signals intended to be transmitted on the downlink, at a sufficiently high power, and in the frequency band of the downlink.

A filtering section FIL makes it possible, after the high-power amplifiers, to demultiplex the channels. Each channel is then temporally distributed between a plurality of spots. The amplification section is connected to a passive antenna system comprising a reflector REF2 and a set of sources SRC intended to illuminate an area of the Earth, commonly called "spot". One or more user terminals may be located in each spot.

In order to illuminate a number of spots greater than the number of frequency channels, a beam hopping system is implemented. The payload according to the invention implements a beam hop using a plurality of ring-shaped routing devices DRA. The "ring-shaped" configuration makes it possible to connect a plurality of sources SRC to a plurality of inputs from the amplification section. Each ring-shaped routing device DRA comprises Ne input ports E, where Ne≥2. The ring-shaped routing device DRA according to the invention is thus distinguished from beam-hopping devices from the prior art that have only a single input port connected to the amplification section (and two or four output ports). Moreover, the ring-shaped routing device DRA according to the invention has Ns output ports S (Ns≥Ne). Each output port is connected to a source SRC in order to illuminate a spot. At each time t, Ne output ports are supplied.

Thus, depending on the desired coverage, a certain number of output ports and therefore sources have to be connected selectively to an input port, or not be supplied.

The antenna system of the payload according to the invention does not require an active antenna, thereby limiting its production cost.

By way of example, with six docking stations, it is possible to supply twenty-four high-power amplifiers HPA (each docking station makes it possible to supply four tubes over 2.9 GHz). These high-power amplifiers HPA make it possible to supply sixteen ring-shaped routing devices DRA (each ring-shaped routing device DRA is supplied by three half-bands). With each ring-shaped routing device DRA supplying nine spots, it is therefore possible to supply one hundred and forty-four spots on the ground.

Having at least two input ports, in contrast to 1 to 2 or 1 to 4 switching schemes, also makes it possible to continue to supply spots in "degraded" mode, without interrupting service. For example, if one high-power amplifier HPA (out of the three connected to the ring-shaped routing device DRA) breaks down, it is possible to continue to supply the spots initially covered with two high-power amplifiers, with a third less capacity. As a result, it is even possible to eliminate redundant high-power amplifiers that are usually on board a payload, that is to say those that are used only in the event of a fault with one of the amplification devices, in that no spot is lost in the event of a fault. This same property makes it possible to gradually deploy the docking stations, which is tantamount to restarting the system with a docking station subset and then increasing the number thereof as demand grows (optimizing the costs of the system).

A control device DCO makes it possible to control and to modify the connection and/or disconnection states of each of the output ports of the ring-shaped routing devices DRA, on the basis of the desired capacity distribution. The control device DCO may take the form of an electronic board or a subassembly of an electronic board, able to control the switching of the connection state of the output ports of all of the ring-shaped routing devices DRA. The control device DCO is connected to all of the ring-shaped routing devices DRA, even though in FIG. 1 the control device DCO is connected to a single ring-shaped routing device DRA in order to make the figure more legible.

Advantageously, each filtering device FIL is coupled to one of the high-power amplifiers HPA. Each filtering device FIL comprises a high-pass filter and a low-pass filter, the input ports of a ring-shaped routing device DRA being coupled exclusively to high-pass filters or exclusively to low-pass filters. It is thus possible to implement a four-colour coverage scheme, each colour being defined by a polarization/frequency pair. Four adjacent spots may thus be isolated from one another.

It is of course possible to use finer filtering, for example by dividing each frequency channel after amplification into four frequency sub-bands, or into a greater number.

The filtering is optional: it is possible to supply the sources using just one and the same frequency band, without frequency sharing.

Advantageously, the input E and output S ports of the routing device are connected to one another by at least one R-type ferrite switch, or by at least one SP2T ferrite switch. These switches make it possible to channel high powers. It is known to use mechanical R-type switches on board payloads. Specifically, in redundancy rings AR, in the event of a fault with a subassembly of the payload, for example the low-noise amplifier block LNA, or else the high-power amplification block HPA, the mechanical R-type switch is used. Given that the cases of faults in one of these subassemblies are statistically not very many, a switching operation may be performed mechanically. The ring-shaped routing device according to the invention is for its part designed to switch at a high frequency, in particular in order to perform time multiplexing. Thus, the R-type ferrite switch, which does not have a mobile part, thus makes it possible to quickly and repeatedly vary the path of the signals passing through the R-type ferrite switch, and without interrupting the transmission of the data packet, or at the very most with an extremely short interruption of the order of a few microseconds.

Figure 2:
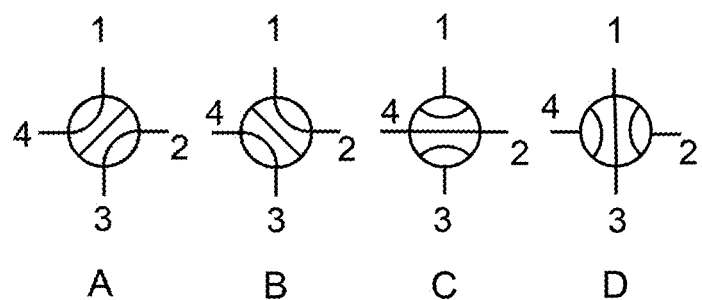
FIG. 2 shows the four positions that an R-type ferrite switch is able to adopt at a time t.

FIG. 2 illustrates the various positions that an R-type ferrite switch is able to adopt. The R-type ferrite switch is a four-pole component (said poles being numbered 1, 2, 3 and 4 in the clockwise direction), formed of guided sections that may not intersect. In a first position A, poles 1 and 4 are connected by a guided path, and poles 2 and 3 are connected by another guided path (what is called tennis ball configuration). In a second position B, poles 1 and 2 are connected by a guided path, and poles 3 and 4 are connected by another guided path (what is called curved or tennis ball configuration). In a third position C, poles 2 and 4 are connected by a guided path, and poles 1 and 3 are isolated from one another (what is called through-configuration). In a fourth position D, poles 1 and 3 are connected by a guided path, and poles 2 and 4 are isolated from one another (what is called through-configuration). Depending on the magnetization of the ferrite elements present in the R-type ferrite switch, this adopts one or the other of the positions out of the four positions that are shown.

From a structural point of view, each R-type ferrite switch is formed of four ferrite circulators (or SP2T ferrite switches) connected to one another.

Figure 3:
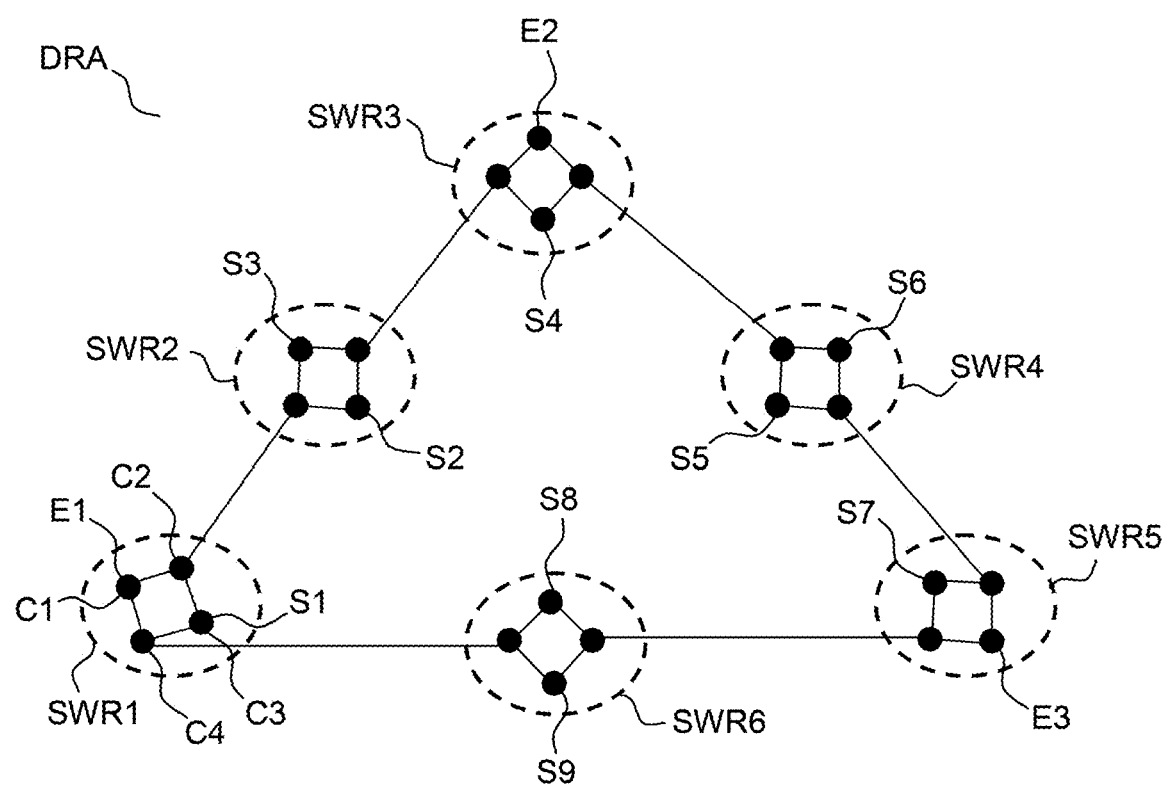
FIG. 3 shows a diagram of a first embodiment of a ring-shaped routing device according to the invention.

FIG. 3 illustrates an exemplary implementation of a routing device according to the invention. It comprises a first E1, a second E2 and a third E3 input port. Each of the input ports is connected directly or indirectly (via a filtering device) to a high-power amplifier such as a tube HPA. The routing device also comprises a first S1, a second S2, a third S3, a fourth S4, a fifth S5, a sixth S6, a seventh S7, an eighth S8 and a ninth S9 output port. Each of the output ports is connected to a source SRC, in the knowledge that the output port may or may not be supplied by an input port, depending on the configuration of the R-type ferrite switches.

For example, if the R-type ferrite switch SWR6 is in the through position connecting the R-type ferrite switches SWR1 and SWR5, the output ports S8 and S9 do not receive any signal; the sources connected to these output ports are thus deactivated.

The position of each of the R-type ferrite switches is determined such that each signal arriving at an input port is able to leave at an output port. A given R-type ferrite switch is therefore not able to be assigned a through position connecting two output ports, such as for example the output ports S8 and S9 in the R-type ferrite switch SWR6.

The routing device illustrated in FIG. 3 has a triangular schematic configuration with three inputs and nine outputs.

It comprises a first R-type ferrite switch SWR1 coupled to the first input port E1 and to the first output port S1, a second R-type ferrite switch SWR2 coupled to the first ferrite switch SWR1, to the second output port S2 and to the third output port S3, a third R-type ferrite switch SWR3 coupled to the second R-type ferrite switch SWR2, to the second input port E2 and to the fourth output port S4, a fourth ferrite switch SWR4 coupled to the third R-type ferrite switch SWR3, to the fifth output port S5 and to the sixth output port S6, a fifth R-type ferrite switch SWR5 coupled to the fourth R-type ferrite switch SWR4, to the third input port E3 and to the seventh output port S7, a sixth R-type ferrite switch SWR6 coupled to the fifth R-type ferrite switch SWR5, to the first R-type ferrite switch SWR1, to the eighth output port S8 and to the ninth output port S9.

For example, the signal arrives at the first input port E1, the control device DCO is able to control the first R-type ferrite switch SWR1 so as to be in the through position, and the signal is thus able to be transmitted to the source connected to the first output port S1. As a variant, the control device may control the first R-type ferrite switch SWR1 and the second R-type ferrite switch SWR2 so as to be in the curved (or tennis ball) position; the signal may thus be transmitted to the source connected to the second output port S2 or to the third output port S3.

The combination options for the possible positions are limited by the fact that each signal arriving at an input port has to be able to be routed to an output port, without crossing another signal. The required configuration is imposed by the desired capacity distribution, as illustrated hereinafter.

Moreover, the definition of the path taken by each signal may be governed by the number of R-type ferrite switches to be passed through; power losses increase with the number of R-type ferrite switches passed through.

Figure 4A:
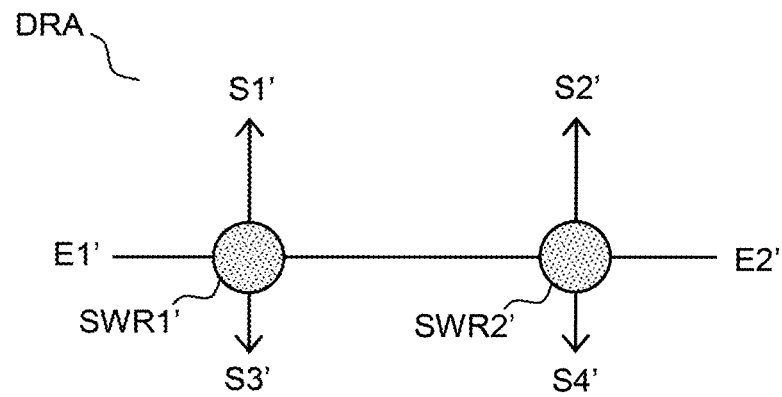
FIGS. 4A and 4B show a second embodiment of a ring-shaped routing device according to the invention, respectively in an illustration with R-type ferrite switches and in an illustration with SP2T ferrite switches.
Figure 4B:
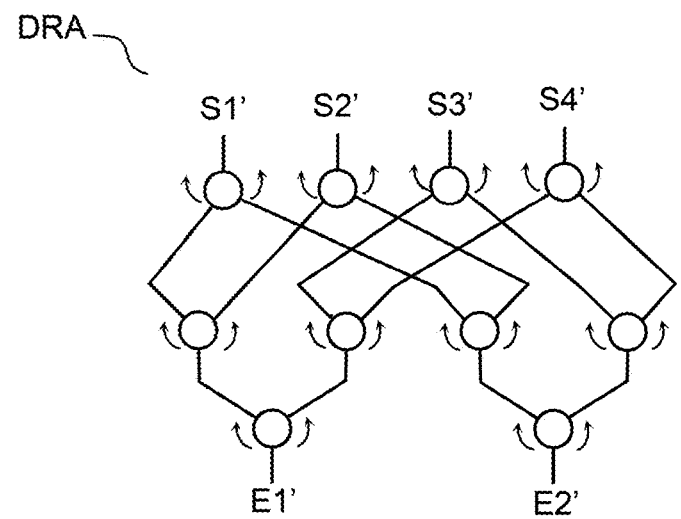

FIGS. 4A and 4B illustrate a second embodiment of the routing device according to the invention.

FIG. 4A shows the ring-shaped routing device in an overview, with the R-type ferrite switches. It comprises a first E1' and a second E2' input port, and a first St, a second S2', a third S3' and a fourth S4' output port. Each input port is connected indirectly or directly to one of the high-power amplifiers, for example tubes. Each output port is connected to its corresponding source, which is supplied depending on the command provided by the control device DCO. The ring-shaped routing device DRA comprises a first R-type ferrite switch SWR1' coupled to the first input port E1', to the first output port St and to the third output port S3', and a second R-type ferrite switch SWR2' coupled to the second input port E2', to the second output port S2' and to the fourth output port S4'.

FIG. 4B shows the same ring-shaped routing device, with SP2T ferrite switches. The payload according to the invention specifically makes it possible to switch SP2T ferrite switches in ring-shaped routing devices using the same principle as for R-type ferrite switches. The ring-shaped routing device DRA comprises Ne input ports (E1', E2') and Ns output ports (S1'-S4'), where 2≤Ne≤Ns.

The second embodiment thus allows the routing device to select one output out of four for each of the two inputs.

FIG. 5 shows an example of a distribution scheme of 144 spots over the coverage with the payload according to the invention. In FIG. 5, the spots are rectangular; other spot shapes may be contemplated without this limiting the invention. The distribution scheme uses a four-colour scheme. The four colours may be defined by a pair {band, polarization}. Thus, as illustrated by FIG. 5, colour 1 is defined by the pair {band 1, polarization 1}, colour 2 is defined by the pair {band 1, polarization 2}, colour 3 is defined by the pair {band 2, polarization 1}, and colour 4 is defined by the pair {band 2, polarization 2}. Bands 1 and 2 may respectively be the upper sub-band and the lower sub-band after passing through the filtering devices FIL. Polarizations 1 and 2 may respectively be left-hand circular (or elliptical) polarization and right-hand circular (or elliptical) polarization, or else two orthogonal linear polarizations.

Figure 6:
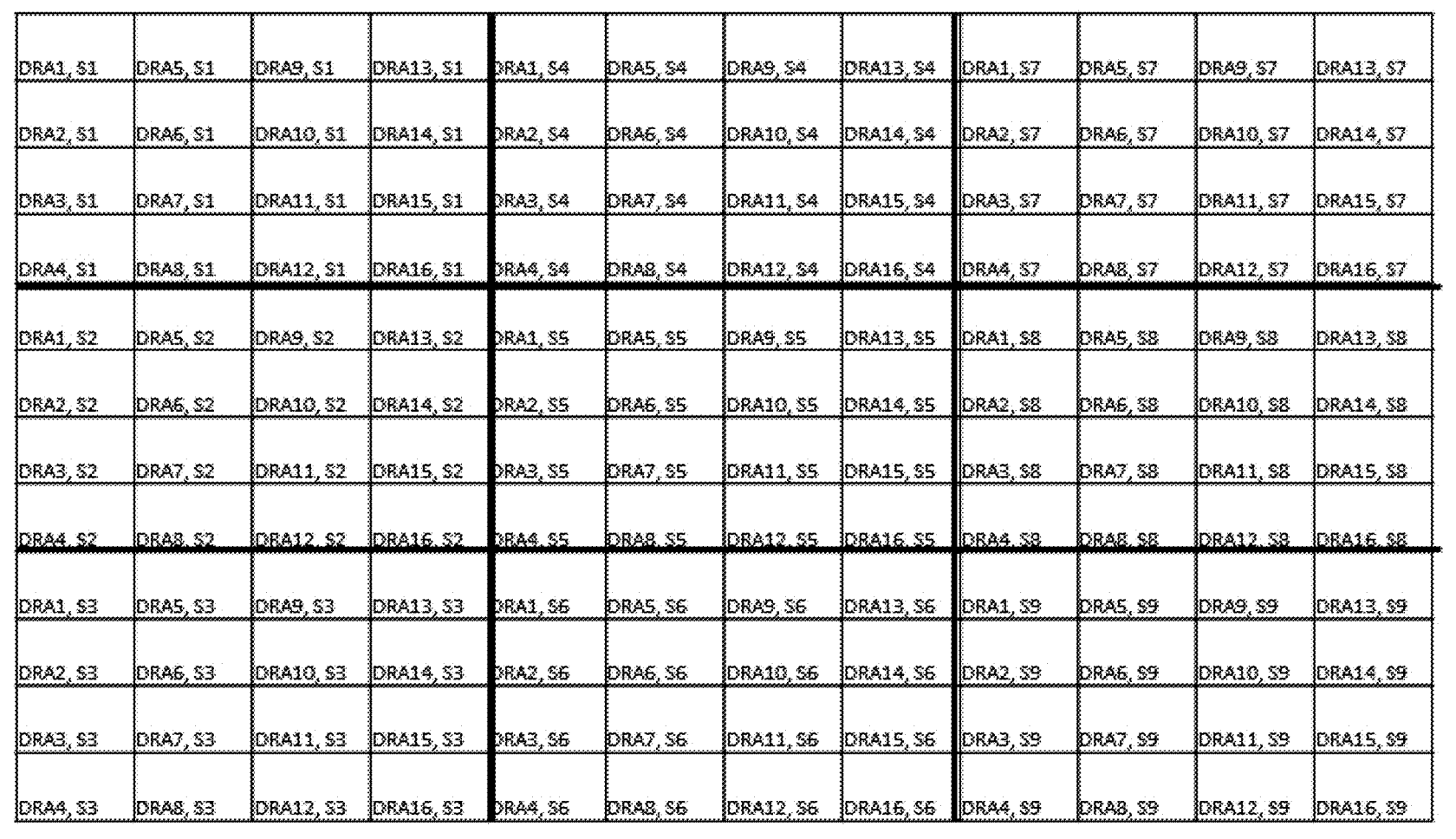

FIG. 6 illustrates an embodiment of the distribution of the outputs of a routing device according to the invention. The surface covered by the telecommunications satellite may be divided into Ns elementary meshes (ME1 . . . ME9), for example nine elementary meshes. Each of the elementary meshes advantageously contains an identical number of spots, which corresponds to the number of ring-shaped routing devices DRA. Advantageously, the number of elementary meshes is equal to the number of output ports of each of the ring-shaped routing devices DRA. Thus, in each elementary mesh, each spot corresponds to the output of a different ring-shaped routing device DRA. The ring-shaped routing device (DRA1, . . . , DRA16) and the supplied output port (S1, . . . , S9) are indicated in each spot. For example, in the top-left elementary mesh ME1, the four spots of the first column starting from the left correspond respectively to the first output of four ring-shaped routing devices numbered 1 to 4. The four spots of the second column starting from the left correspond respectively to the first output of four ring-shaped routing devices numbered 5 to 8. The four spots of the third column starting from the left correspond respectively to the first output of four ring-shaped routing devices numbered 9 to 12. The four spots of the fourth column starting from the left correspond respectively to the first output of four ring-shaped routing devices numbered 13 to 16. This correspondence pattern between the output ports of the ring-shaped routing devices and the sources is reproduced in each elementary mesh. Thus, in each elementary mesh, the sources are connected to different ring-shaped routing devices. As indicated above, the ring-shaped routing devices DRA then make it possible to connect a filtering device FIL to a source SRC, which then transmits the corresponding communication signal. On one and the same ring-shaped routing device, each output connected to a source belongs to a different elementary mesh.

FIGS. 7A, 7B and 7C illustrate an embodiment in which the number of output ports supplied is equal to the number of input ports (Ns=Ne) at each time t. In this case, the connections are permanent. In addition, all of the rings are configured identically. In FIGS. 7A to 7C, the "1"s represent the output ports of one and the same ring-shaped routing device DRA. The same notation could be applied to all of the output ports of one and the same ring-shaped routing device DRA. In this configuration, a third of the output ports of one and the same ring-shaped routing device, that is to say three out of nine, are effectively supplied continuously, and the others are never supplied. Thus, in FIG. 7A, the three elementary meshes are shaded on the right, supplying three of the nine output ports, in all of the ring-shaped routing devices DRA. With reference to FIG. 3, the output ports S7, S8 and S9 of all of the ring-shaped routing devices DRA are supplied. The other output ports are all in a disconnection state. This coverage may be achieved by putting the third R-type ferrite switch SWR3 into the curved position, the fourth R-type ferrite switch SWR4 into the through position SWR3-SWR5, and the fifth R-type ferrite switch SWR5 into the curved position. Moreover, the sixth R-type ferrite switch SWR6 is in the curved position, as is the first R-type ferrite switch SWR1.

In FIG. 7B, the three elementary meshes are shaded in the centre, supplying three of the nine output ports, in all of the ring-shaped routing devices DRA. With reference to FIG. 3, the output ports S4, S5 and S6 of all of the ring-shaped routing devices DRA are supplied. The other output ports are all in a disconnection state. The way in which the position of the R-type ferrite switches is set is similar to that in FIG. 7A, such that there is no interference between the paths of the signals arriving at the three input ports, and the output ports S4, S5 and S6.

In FIG. 7C, the three elementary meshes are shaded on the left, supplying three of the nine output ports, in all of the ring-shaped routing devices DRA. With reference to FIG. 3, the output ports S1, S2 and S3 of all of the ring-shaped routing devices DRA are supplied. The other output ports are all in a disconnection state. The way in which the position of the R-type ferrite switches is set is similar to that in FIG. 7A, such that there is no interference between the paths of the signals arriving at the three input ports, and the output ports S1, S2 and S3.

This configuration results in flexibility in terms of coverage being able to be achieved easily by switching the ring-shaped routing devices DRA. Specifically, the coverage of the satellite, that is to say the shaded area, is able to track demand on the basis of the longitude of the covered area. For example, if the total coverage area, that is to say all of the elementary meshes, corresponds schematically to a country with a wide longitude, such as the United States of America, FIG. 7A corresponds to coverage of the eastern part of the United States of America at a time T1, FIG. 7B corresponds to the central part of the country at a time T2 (for example T1+3 h), and FIG. 7C corresponds to the western part of the country at a time T3 (for example T2+3 h).

Figure 8B:
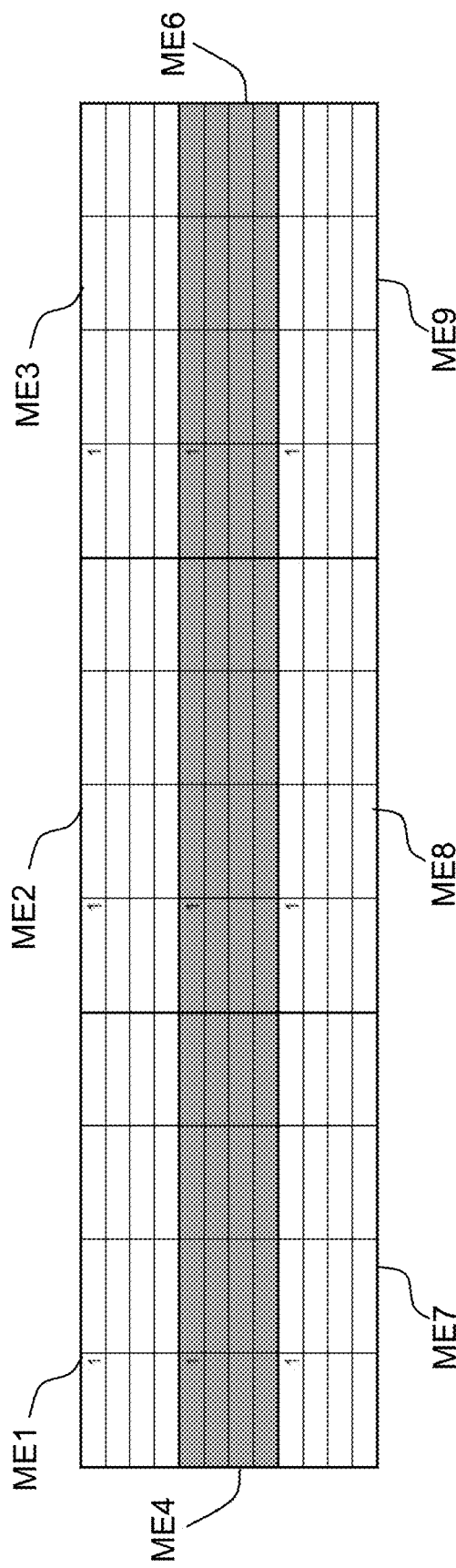
Figure 8C:
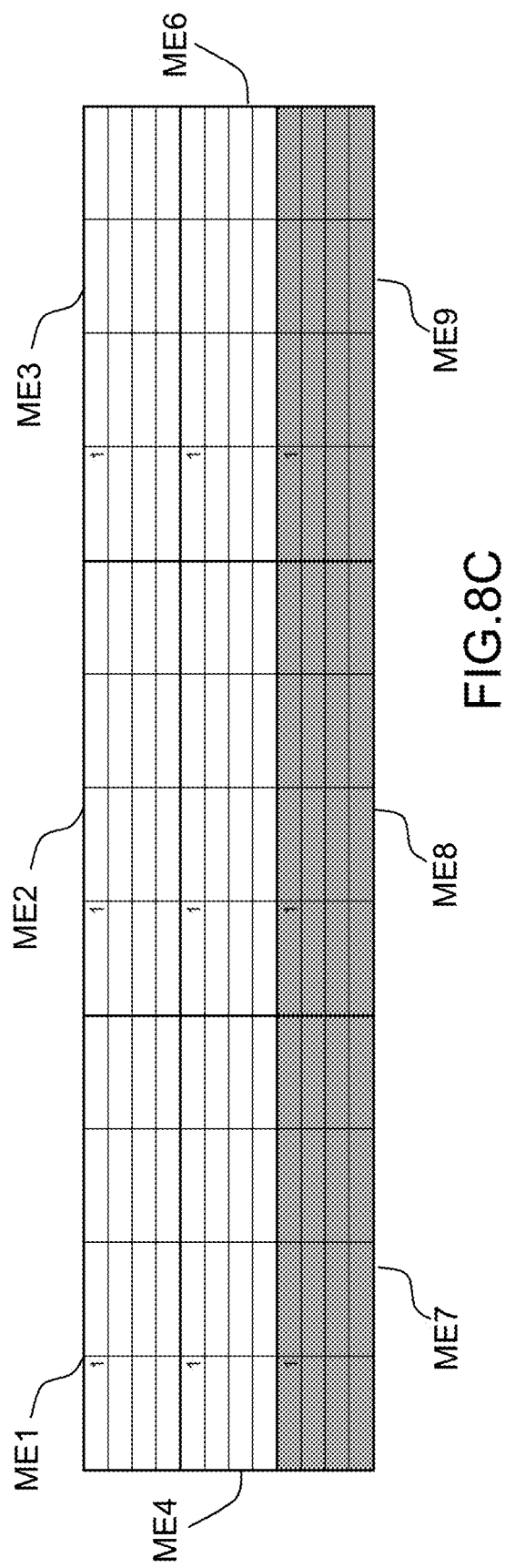

FIGS. 8A, 8B and 8C illustrate another configuration illustrating the flexibility in terms of coverage of the payload according to the invention. In this configuration, the number of output ports supplied is equal to the number of input ports (Ns=Ne). With reference to FIG. 3, in FIG. 8A, all of the output ports S1, S4 and S7 of all of the ring-shaped routing devices are supplied. The other output ports are in a disconnection state. There is therefore coverage of the entire upper band of the total surface. With reference to the ring-shaped routing device DRA illustrated by FIG. 3, this coverage may be achieved by putting the first R-type ferrite switch SWR1 into the through position E1-S1, the third R-type ferrite switch SWR2 into the through position E2-S4, and the fifth R-type ferrite switch SWR5 into the through position E3-S7.

In FIG. 8B, all of the output ports S2, S5 and S8 of all of the ring-shaped routing devices are supplied. The other output ports are in a disconnection state. There is therefore coverage of the entire central band of the total surface. With reference to the ring-shaped routing device DRA illustrated by FIG. 3, this coverage may be achieved by putting the six R-type ferrite switches into the curved (tennis ball) position.

In FIG. 8C, all of the output ports S3, S6 and S9 of all of the ring-shaped routing devices are supplied. The other output ports are in a disconnection state. There is therefore coverage of the entire lower band of the total surface. With reference to the ring-shaped routing device DRA illustrated by FIG. 3, this coverage may be achieved by putting the six R-type ferrite switches into the curved (tennis ball) position.

This configuration offers flexibility in terms of coverage, in particular if there is a need to cover various areas that have different latitudes at successive periods of the day. This configuration makes it possible for example to track one or more aircraft, performing a north to south connection, in order to provide an on-board telecommunications link.

It is of course possible, for each ring-shaped routing device, to connect a number of output ports greater than the number of inputs.

Figure 9A:
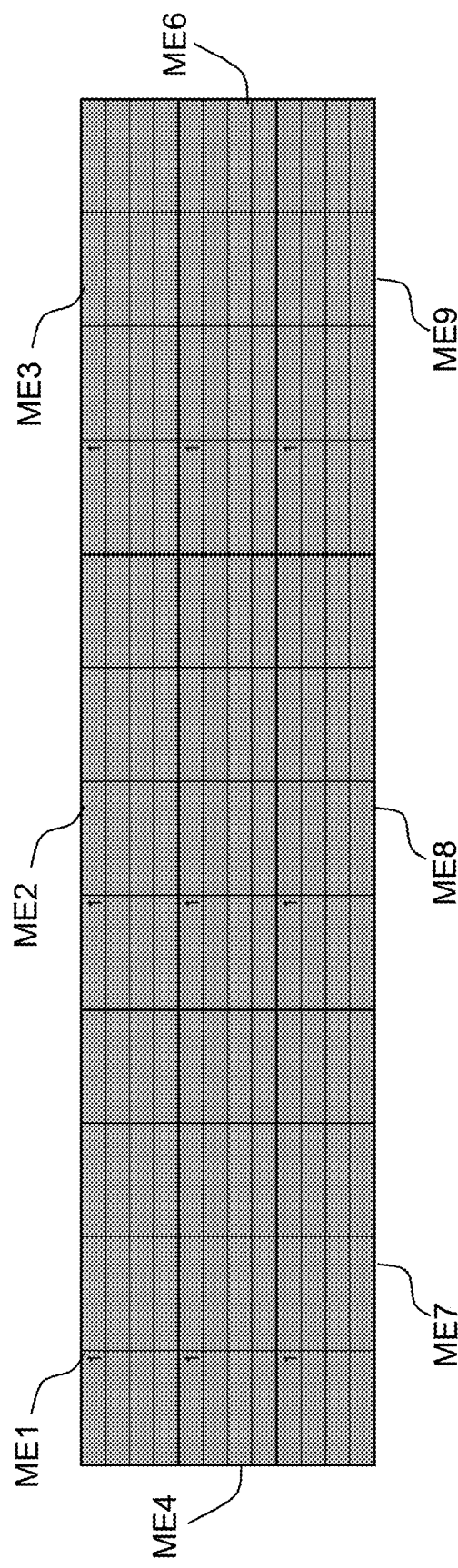
Figure 9B:
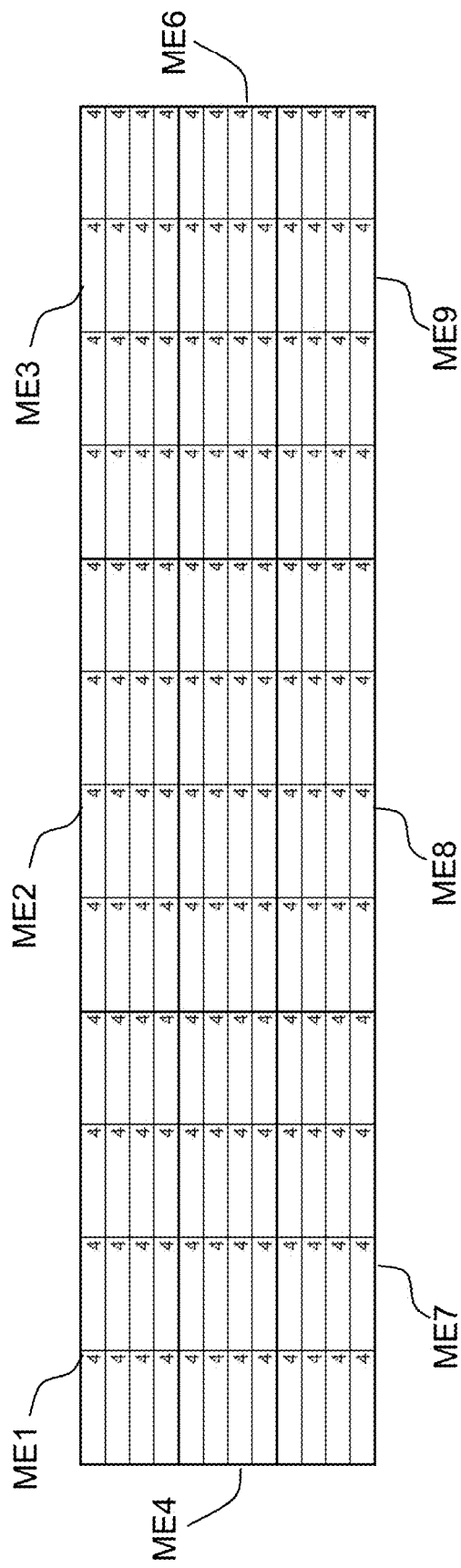

In FIG. 9A, all of the elementary meshes are covered. In each ring-shaped routing device, given that the number of output ports connected to a source is greater than the number of input ports, it is necessary to implement time multiplexing, illustrated by FIG. 9B. For example, over a period, for each data frame comprising 12 time slots, three elementary meshes receive time slots numbers 1-4, three other elementary meshes receive time slots numbers 5-8, and three other elementary meshes receive time slots numbers 9-12 (what is called "homogeneous" distribution). The same scheme is repeated for the following periods. Each spot thus receives four time slots. The elementary meshes may be grouped together for example as illustrated in FIGS. 7A-7C, or 8A-8C. The number of output ports connected over a period is between Ne and Ns.

Figure 10:
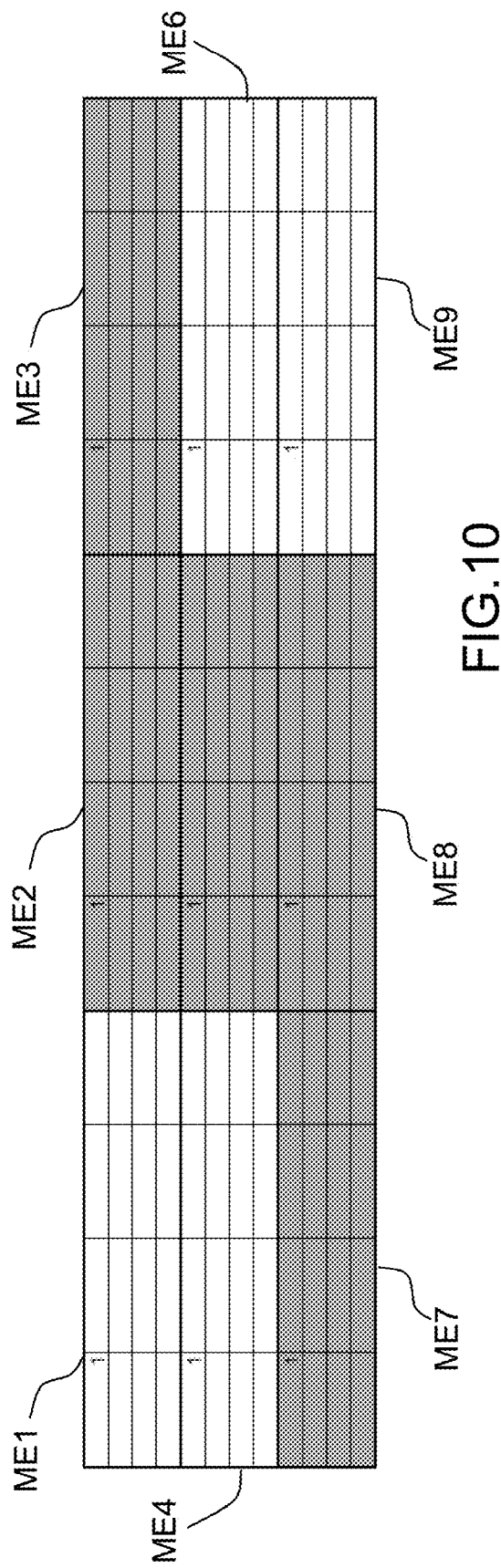

FIG. 10 illustrates another exemplary configuration in which, for each ring-shaped routing device, five output ports out of nine are in a state connected to their source, and the other output ports are disconnected. With reference to FIG. 3, the output ports S3, S4, S5, S6 and S7 are supplied. It is therefore necessary to implement time multiplexing on each period, since the number of output ports supplied is greater than the number of input ports.

The exemplary configurations described up until now are what are called "identical" configurations: all of the ring-shaped routing devices are configured in the same way, that is to say that the supplied or non-supplied state of each output is identical from one routing device to another.

Figure 11:
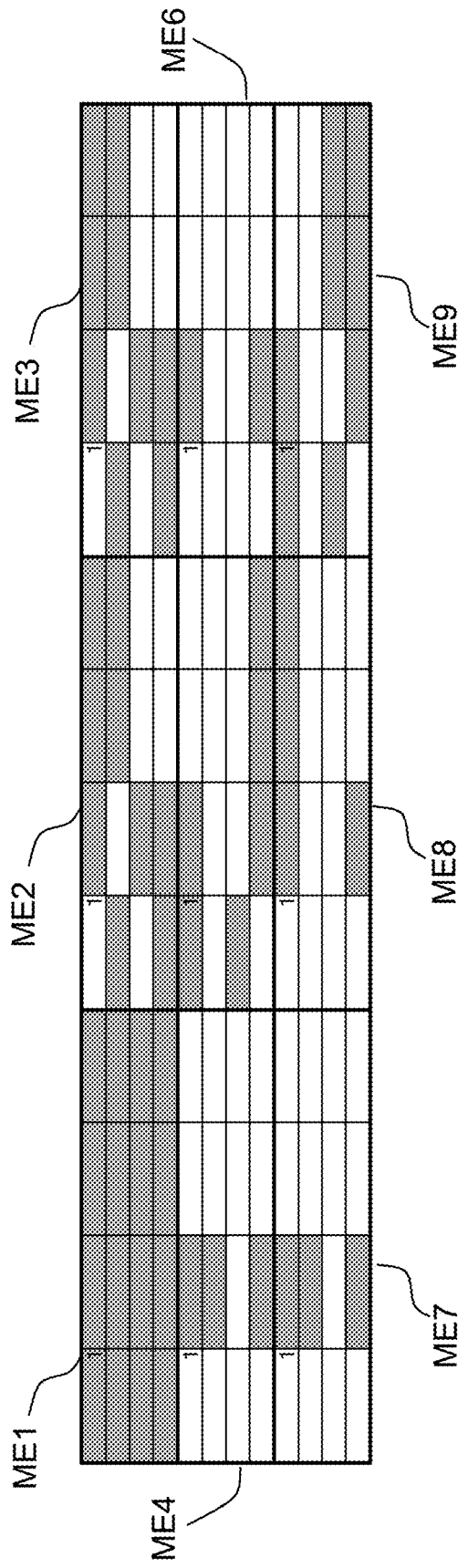

It is entirely conceivable, with the payload according to the invention, to achieve finer coverage in each elementary mesh, as illustrated for example by FIG. 11. In this figure, it appears that, from one routing device to another, it is not the same output ports that are supplied. This configuration illustrates the ability of the payload to modulate the illumination of the spots in two dimensions, that is to say illuminate some areas and not others depending on the latitude and the longitude of the area, on the basis of coverage constraints required by operators. In FIG. 11, time multiplexing is necessary on each period, since the number of output ports supplied is greater than the number of input ports.

FIG. 12 illustrates another example of time multiplexing. The number situated inside each spot represents the number of time slots allocated to a spot. Given that the various frames received at each input port have the same length, the control device works such that the sum of the time slots received simultaneously at each of the Ne input ports E of each ring-shaped routing device DRA is equal to the sum of the time slots associated with the supplied output ports S of one and the same ring-shaped routing device DRA. For example, with reference to FIG. 12, considering the ring-shaped routing device DRA whose output ports are connected to the sources that illuminate the spot at the bottom right of each elementary mesh: assuming that each period comprises twelve time slots, the ring-shaped routing device receives thirty-six time slots (3×12) during each period. The spot of the elementary mesh at the top left is associated with twelve time slots, whereas the spots of the other elementary meshes are each associated with three time slots, thereby making a total of 12+3×8=36 time slots at output. This so-called heterogeneous distribution makes it possible to distribute the capacity over the entire coverage. Flexibility in terms of capacity is therefore achieved by virtue of the payload according to the invention.

FIG. 13 illustrates another example of time multiplexing. As in the previous examples, operation should take place such that, over each period, the sum of the time slots received simultaneously at each of the Ne input ports E of each ring-shaped routing device DRA is equal to the sum of the time slots associated with the supplied output ports S of one and the same ring-shaped routing device DRA. FIG. 13 illustrates mixed use in terms of coverage (some areas covered, others not) and in terms of distribution (some areas receive more capacity than others) of the payload according to the invention: the spots having 0 time slots are considered to be out of coverage. The scheme of FIG. 13 may correspond to a demand scheme of an operator: many clients are located in the shaded areas, fewer in the white areas, and none at all in the hatched areas. This scheme is actually adaptive in that, depending on the time of day, the ring-shaped routing devices are able to be reconfigured depending on demand, for example by modifying the positions of the R-type ferrite switches. Likewise, it is possible to allocate a certain non-zero capacity to an area in which there is demand and, as soon as this area is served by high-throughput fibre-optic or cable wired networks, to reduce the capacity allocated to the area, or even to no longer cover it at all.

It should be noted that the payload according to the invention is compatible with gradual deployment of satellite gateways (or docking stations), thereby possibly meeting a desire of the operators. Specifically, at the start of a mission, it is common for the operator not to have all of the satellite gateways. In this case, all of the high-power amplifiers on board the satellite are not used. It is thus possible to operate with a single input port at the start of the mission in each routing device, and then to activate the other input ports progressively.

The invention claimed is:

1. A telecommunications payload for multibeam satellite coverage, comprising at least one antenna and a plurality of sources (SRC) connected to the antenna in order to deliver a beam corresponding to a spot on the Earth's surface, the payload comprising a plurality of high-power amplifiers (HPA) configured so as to supply the sources (SRC), wherein the payload also comprises a plurality of ring-shaped routing devices (DRA), each ring-shaped routing device (DRA) comprising Ne input ports (E), where Ne≥2, each input port (E) being connected to one of the high-power amplifiers (HPA), and also comprising Ns output ports (S), each output port (S) being connected firstly to a source (SRC), and being able to be connected secondly to at most one input port (E), and changing alternately from a connection state to a disconnection state, each ring-shaped routing device (DRA) being configured such that, at a time t, Ne output ports (S) out of the Ns output ports (S) are able to be supplied depending on the desired coverage.

2. The payload according to claim 1, comprising a control device (DCO) configured so as to control, in each ring-shaped routing device (DRA), the connection or the disconnection of each output port (S) with respect to each of the input ports (E), the control device (DCO) applying a command such that, for each data signal received by the payload and arriving at an input port (E), there is only one possible path between the input port (E) and the desired output port (S), and that there is no interference between various paths in the ring-shaped routing device (DRA).

3. The payload according to claim 2, wherein the control device (DCO) is configured so as to implement time multiplexing such that, over a given period, for each set of Ne frames each formed of a number of identical time slots, the sum of the time slots received simultaneously at each of the Ne input ports (E) of the ring-shaped routing device (DRA) is equal to the sum of the time slots associated with the connected output ports (S) of one and the same ring-shaped routing device (DRA), the number of connected output ports (S) over said period being between Ne and Ns.

4. The payload according to claim 1, wherein the surface covered by the telecommunications satellite is able to be divided into Ns elementary meshes (ME), each elementary mesh (ME) containing as many spots as the payload comprises ring-shaped routing devices (DRA).

5. The payload according to claim 1, wherein the input (E) and output (S) ports are connected to one another, in the ring-shaped routing device (DRA), by at least one R-type ferrite switch (SWR), or by at least one SP2T ferrite switch.

6. The payload according to claim 5, wherein the ring-shaped routing device (DRA) comprises a first (E1), a second (E2) and a third (E3) input port, and a first (S1), a second (S2), a third (S3), a fourth (S4), a fifth (S5), a sixth (S6), a seventh (S7), an eighth (S8) and a ninth (S9) output port, and moreover comprises a first R-type ferrite switch (SWR1) coupled to the first input port (E1) and to the first output port (S1), a second R-type ferrite switch (SWR2) coupled to the first ferrite switch (SWR1), to the second output port (S2) and to the third output port (S3), a third R-type ferrite switch (SWR3) coupled to the second R-type ferrite switch (SWR2), to the second input port (E2) and to the fourth output port (S4), a fourth ferrite switch (SWR4) coupled to the third R-type ferrite switch (SWR3), to the fifth output port (S5) and to the sixth output port (S6), a fifth R-type ferrite switch (SWR5) coupled to the fourth R-type ferrite switch (SWR4), to the third input port (E3) and to the seventh output port (S7), a sixth R-type ferrite switch (SWR6) coupled to the fifth R-type ferrite switch (SWR5), to the first R-type ferrite switch (SWR1), to the eighth output port (S8) and to the ninth output port (S9).

7. The payload according to claim 5, wherein the ring-shaped routing device comprises a first (E1') and a second (E2') input port, and a first (S1'), a second (S2'), a third (S3') and a fourth (S4') output port, and moreover comprises a first R-type ferrite switch (SWR1') coupled to the first input port (E1'), to the first output port (S1') and to the third output port (S3'), and a second R-type ferrite switch (SWR2') coupled to the second input port (E2'), to the second output port (S2') and to the fourth output port (S4').

8. The payload according to claim 1, comprising a plurality of filtering devices (FIL), each filtering device (FIL) being coupled to one of the high-power amplifiers (HPA), each filtering device (FIL) comprising a high-pass filter and a low-pass filter, the input ports (E) of a ring-shaped routing device (DRA) being coupled exclusively to high-pass filters or exclusively to low-pass filters.

9. The payload according to claim 1, comprising sixteen ring-shaped routing devices (DRA), and wherein Ne=3, Ns=9.

10. A satellite comprising a payload according to claim 1.

* * * * *